US 8,600,811 B2

(12) United States Patent
Humphries, IV et al.

(10) Patent No.: US 8,600,811 B2
(45) Date of Patent: Dec. 3, 2013

(54) AFFILIATE MARKETING METHOD THAT PROVIDES INBOUND AFFILIATE LINK CREDIT WITHOUT CODED URLS

(75) Inventors: Wofford F. Humphries, IV, Cary, NC (US); Ernest C. St. Gelais, Colorado Springs, CO (US); Wofford F. Humphries, III, Highlands, NC (US); Andrew K. Crum, Durham, NC (US)

(73) Assignee: LinkConnector Corporation, Cary, NC (US)

( * ) Notice: Subject to any disclaimer, the term of this patent is extended or adjusted under 35 U.S.C. 154(b) by 1877 days.

(21) Appl. No.: 11/210,333

(22) Filed: Aug. 24, 2005

(65) Prior Publication Data
US 2007/0050245 A1 Mar. 1, 2007

(51) Int. Cl.
*G06Q 30/00* (2012.01)
(52) U.S. Cl.
USPC ...................................................... 705/14.47
(58) Field of Classification Search
USPC .......................................................... 705/14
See application file for complete search history.

(56) References Cited

U.S. PATENT DOCUMENTS

| | | | |
|---|---|---|---|
| 5,712,979 A | | 1/1998 | Graber et al. |
| 6,029,141 A | | 2/2000 | Bezos et al. |
| 6,629,135 B1 | | 9/2003 | Ross, Jr. et al. |
| 6,725,222 B1 | | 4/2004 | Musgrove et al. |
| 2001/0037205 A1* | 11/2001 | Joao ................................. 705/1 |
| 2002/0029290 A1* | 3/2002 | Burema et al. ................ 709/238 |
| 2002/0052806 A1 | 5/2002 | Hodson et al. |
| 2002/0052948 A1 | 5/2002 | Baudu et al. |
| 2002/0077930 A1 | 6/2002 | Trubey et al. |
| 2002/0082919 A1 | 6/2002 | Landau et al. |
| 2002/0099622 A1 | 7/2002 | Langhammer |
| 2002/0128925 A1 | 9/2002 | Angeles |
| 2002/0133412 A1 | 9/2002 | Oliver et al. |
| 2003/0014331 A1 | 1/2003 | Simons |
| 2003/0023687 A1* | 1/2003 | Wolfe ........................... 709/206 |
| 2003/0105677 A1 | 6/2003 | Skinner |
| 2003/0135413 A1 | 7/2003 | Nishi et al. |
| 2003/0167212 A1 | 9/2003 | Monteverde |
| 2003/0195837 A1 | 10/2003 | Kostic et al. |
| 2004/0044566 A1 | 3/2004 | Bostelmann et al. |
| 2004/0073644 A1 | 4/2004 | Koch et al. |
| 2004/0148366 A1 | 7/2004 | Ross, Jr. et al. |

(Continued)

OTHER PUBLICATIONS

A.T. Rendon, Protect Your Affiliate Commissions!, Nov. 25, 2002 WebProNews.*

(Continued)

*Primary Examiner* — Matthew L Hamilton
(74) *Attorney, Agent, or Firm* — Coats & Bennett, P.L.L.C.

(57) ABSTRACT

A method of affiliate marketing provides inbound affiliate link credit without coded URLs. Affiliate web sites link directly to merchant web sites, so that all of a merchant site's affiliates potentially contribute to its inbound link credit. The merchant web server parses incoming web page requests, and extracts the referrer. The merchant web server, directly or via an affiliate network manager, consults a database of affiliate web sites to determine whether the referrer is an authorized affiliate. If so, the affiliate is credited for the traffic, and may additionally be credited for user activity at the merchant site. The affiliate network manager writes a cookie to the user terminal to further track the user through the affiliate network. The method reduces or eliminates cookie hijacking and other forms of affiliate fraud, and may be used to track non-affiliate referring web sites.

16 Claims, 4 Drawing Sheets

(56) References Cited

U.S. PATENT DOCUMENTS

| | | |
|---|---|---|
| 2004/0254813 A1 | 12/2004 | Messer |
| 2005/0097107 A1* | 5/2005 | Burt .............................. 707/100 |
| 2005/0177844 A1 | 8/2005 | Levi et al. |
| 2006/0059006 A1* | 3/2006 | Landau et al. .................... 705/1 |

OTHER PUBLICATIONS www.bz10.com—Free URL Redirect and Free URL Masking.*
What is ping?—A definition from Whatis.com.*

* cited by examiner

AFFILIATE MARKETING METHOD THAT PROVIDES INBOUND AFFILIATE LINK CREDIT WITHOUT CODED URLS

FIELD OF THE INVENTION

The present invention relates generally to the Internet, and in particular to an affiliate network marketing method that potentially increases merchant site inbound link credits with organic search engines.

BACKGROUND

U.S. retail sales over the Internet are expected to reach $230 billion by 2008, a level that will represent approximately 10% of total U.S retail sales. As with any other channel, merchants need to drive these retail sales with advertising. One form of advertising unique to the Internet (specifically, to the World Wide Web) is affiliate marketing. An affiliate web site is a web site that experiences a high number of "hits" or visits by web users (also referred to herein as web traffic) that monetizes this traffic by providing hyperlinks to a merchant web site. The links may be in the form of banner advertisements, links embedded in the affiliate web site in text or graphics, pop-up windows that appear in a user's browser upon viewing the affiliate web site, and the like.

The merchant web site may pay the affiliate web site for displaying advertisements, and may additionally pay the affiliate web site for web traffic directed from the affiliate web site to the merchant web site. The most common forms of affiliate marketing compensation are Pay Per Click (PPC), wherein the merchant pays the affiliate for each user visit to its site; Pay Per Lead (PPL), wherein the merchant pays if the user requests information or views additional web pages at the merchant site; or Pay Per Sale (PPS), where the affiliate is paid a flat fee or commission based on purchases a user makes at the merchant site. Merchant web sites may manage their own affiliate web sites, including recruiting affiliates, providing the code to display advertisements and establish links to the merchant web site, tracking user traffic from each affiliate web site and user activity on the merchant web site, and remitting payments to the affiliate web sites.

Alternatively, both merchant and affiliate web sites may utilize the services of an affiliate network manager. The affiliate network manager may selectively and dynamically direct each affiliate web site to display advertising for, and link to, various merchant web sites. Within an affiliate network, merchant web sites may competitively "bid" for advertising and links on the affiliate web sites by making their offers more attractive to affiliates. This process allows merchant web sites to maximize traffic and/or sales by gaining top affiliates. It also maximizes revenue for popular affiliate web sites and those that consistently deliver paying customers.

FIG. 1 depicts a functional block diagram of a representative prior art affiliate network, indicated generally by the numeral 10 (in FIGS. 1 and 2, user redirection is indicated by solid arrows; reading and writing cookies or passing other information is indicated by dotted-line arrows). The network 10 comprises an Affiliate Network Manager site 22, a plurality of Affiliate Web Sites 18, and a plurality of Merchant Web Sites 28 (only one affiliate and one merchant web site depicted in FIG. 1 for simplicity), all interconnected via the Internet 12. A user at a user terminal 14, such as an Internet-connected personal computer executing web browser software, visits an Affiliate Web Site 18, as indicated by the arrow 16. The user may have directly entered the Uniform Resource Locater (URL) of the affiliate web site 18 into his web browser. Alternatively, the user may have "surfed" to the Affiliate Web Site 18, such as by clicking a link from another web site, a search engine, or the like. At the Affiliate Web Site 18, the user is enticed to visit a Merchant Web Site 28, such as by an advertisement, a discount coupon, a positive review of the site or products for sale at the site, or the like. The user clicks a textual or graphic link, which he expects will direct his web browser to the Merchant Web Site 28.

In fact, the link, or URL—which the user never actually sees—directs his web browser to an Affiliate Network Manager site 22, as indicated by the arrow 20. The URL that accomplishes this may be of the form:

http://www.affiliatemanager.com/affiliatesite.php?id=0596

As known in the art, a variety of variables and corresponding values may be appended to a URL to the right of a "?" character. These are known as a query string. Query string contents do not affect the routing function of a web browser, but pass information to the web server of the target of the URL. The above URL directs the user's web browser to the Affiliate Network Manager site 22, with an identification of the Affiliate Web Site 18, and possibly other information in a query string.

Upon the user's web browser accessing the Affiliate Network Manager site 22, the site 22 attempts to read a pre-existing file from the User Terminal 14 that identifies the user, known in the art as a "cookie." If a cookie does not exist, the Affiliate Network Manager site 22 creates one and sends a request to the user's web browser to write the cookie as a file on the user terminal 14 (referred to hereinafter as simply writing a cookie). This is indicated by the dashed-line arrow 24. The cookie allows the affiliate Network Manager Site 22 to identify, and hence track, the user as he visits various Affiliate Web Sites 18 and Merchant Web Sites 28 in the affiliate network. The Affiliate Network Manager site 22 records which Affiliate Web Site 18 originated the merchant traffic and to which Merchant Web Site 28 the user was directed. The Affiliate Network Manager 22 then debits the Merchant Web Site 28 for the referral (in a PPC scheme), and credits the Affiliate Web Site 18.

The Affiliate Network Manager site 22 then directs the user's browser, as indicated by arrow 26, to the Merchant Web Site 28. The user, unaware of the intervention of the Affiliate Network Manager site 22, browses good and services offered for sale at the Merchant Web Site 28. The Merchant Web Site 28 may itself write and read cookies to and from the user's terminal 14, as indicated by the dashed-line arrow 30, to track the user's activity at the Merchant Web Site 28. For example, the Merchant Web Site 28 may use cookies to track items selected for purchase and maintained in a virtual shopping cart. The Merchant Web Site 28 may report page requests and purchases made by the user to the Affiliate Network Manager 22, if the Affiliate Web Site 18 is compensated on a PPL or PPS basis. The Affiliate Network Manager 22 then credits the Affiliate Web Site 18 and debits the Merchant Web Site 28 accordingly.

The advent of affiliate network managers has greatly expanded the affiliate network model of Internet advertising and sales. However, the imposition of an Affiliate Network Manager Site 32 in the referral of web traffic from an Affiliate Web Site 18 to a Merchant Web Site 28 raises at least one significant shortcoming. In addition to affiliate network marketing, web merchants solicit customers from other sources. One particularly important source of web traffic is search engines. As well known in the art, search engines are web sites that maintain databases of other web sites, and present to a user an ordered list of web sites matching or otherwise having relevance to a user's search query. Search engines may return thousands of web sites in response to a given query, and must order these results prior to presenting them to the user. Studies have shown that users typically access only the first few web sites in the list; hence, achieving a high ranking in search result ordering is critical for deriving web traffic from search engines.

A number of techniques may be utilized to order search results by anticipated user relevance. Indeed, the algorithms and techniques utilized to order search results are among the most valuable intellectual property assets of commercial search engine companies. One search result ranking technique that is widely speculated as being employed by popular search engines is known as an inbound link credit. Simply stated, an inbound link credit is a count of the number of web pages cataloged in a search engine database that link to a particular web site. Web sites with a higher inbound link credit will be sorted higher in search results listings, on the theory that a web site to which many other web sites have linked, likely offers content of perceived value, and hence the search engine user is likely to find the site of value as well.

Referring again to FIG. 1, it is evident that a large number of Affiliate Web Sites 18 may direct user traffic to a given Merchant Web Site 28. However, the links that accomplish this are indirect; they link directly to the Affiliate Network Manager site 22. These links are not counted in the inbound link credit of the Merchant Web Site 28. If all Affiliate Web Sites 18 were able to link directly to Merchant Web Sites 28, the Merchant Web Sites 28 may be ranked higher in search engine queries, further increasing user traffic to the Merchant Web Sites 28 and increasing sales opportunities. Another recent problem with many affiliate marketing networks is an unscrupulous practice known as "cookie hijacking." Affiliates attempting to receive credit for traffic rightfully belonging to another affiliate may use adware or spyware to alter key identifying information in the URL on other Affiliate Web Sites 18 that take a user to a Merchant Web Site 28 (indirectly, through the Affiliate Network Manager site 22). For example, the adware or spyware may substitute the unscrupulous affiliate's identification code in the query string for that of the rightful affiliate. In this manner, the unscrupulous affiliate receives credit for all traffic originating at the "hacked" Affiliate Web Sites 18.

SUMMARY

According to one or more embodiments of the present invention, a method of affiliate marketing increases the inbound link credit of merchant web sites. Affiliate web sites link directly to merchant web sites, so that all of a merchant site's affiliates contribute to its inbound link credit. The merchant web server parses incoming web page requests, and extracts the referrer. The merchant web server, directly or via an affiliate network manager, consults a database of affiliate web sites to determine whether the referrer is an authorized affiliate. If so, the affiliate is credited for the traffic, and may additionally be credited for user activity at the merchant site, such as web page requests and purchases. The affiliate network manager writes a cookie to the user terminal to further track the user through the affiliate network. Since the referring affiliate web site is directly identified—that is, the affiliate network manager does not depend on an ID code to identify it—cookie hijacking is virtually eliminated.

In one embodiment, the present invention relates to a method of detecting an affiliate site referring web traffic to a merchant web site by the merchant web server. A web site request from a user is received by a merchant web server. A referrer is extracted from the request. An affiliate database is accessed to determine if the referrer is an authorized affiliate for the merchant. If the referrer is an authorized affiliate, information regarding user activity is provided, such that the affiliate is credited for referring the user to the merchant site.

In another embodiment, the present invention relates to a method of managing an affiliate network. One or more affiliate web sites are directed to provide a link to a merchant web site, with the link transferring a user directly from the affiliate web site to the merchant web site. Notice of a web page request, and the referrer of the request is received at an affiliate network manager site, from the merchant web site. Whether the source domain is one of the affiliate web sites directed to provide a link to the merchant web site is determined. If the referrer was directed to provide a link to the merchant web site, the affiliate web site is credited for the request.

In another embodiment, the present invention relates to a method of reducing cookie hijacking in an affiliate marketing network. A plurality of affiliate web sites are directed to provide a link to one or more merchant web sites, the link transferring a user directly from the affiliate web site to the merchant web site. Notice of a web page request and the referrer of the request is received at an affiliate network manager site, from the merchant web site. The referring web site responsible for directing traffic to the merchant web site is identified from the referrer received from the merchant web site. If the referring web site is an authorized affiliate web site in the network, the affiliate is credited for the request.

In another embodiment, the present invention relates to a web server on a merchant web site. The web server includes a data communication interface to the Internet operative to receive web page requests and to serve web pages in response thereto. The web server additionally includes a processor coupled to the data communication interface operative to extract the referrer from a web page request, and to access an affiliate database to determine if the referrer is an authorized affiliate for the merchant. The processor is further operative to provide information regarding user activity through the data communication interface such that, if the referrer is an authorized affiliate, the affiliate may be credited for referring the user to the merchant site.

DETAILED DESCRIPTION

According to one or more embodiments of the present invention, the inbound link credits of merchant web sites are increased by an affiliate network methodology whereby affiliate web sites link directly to merchant web sites.

Figure 1:
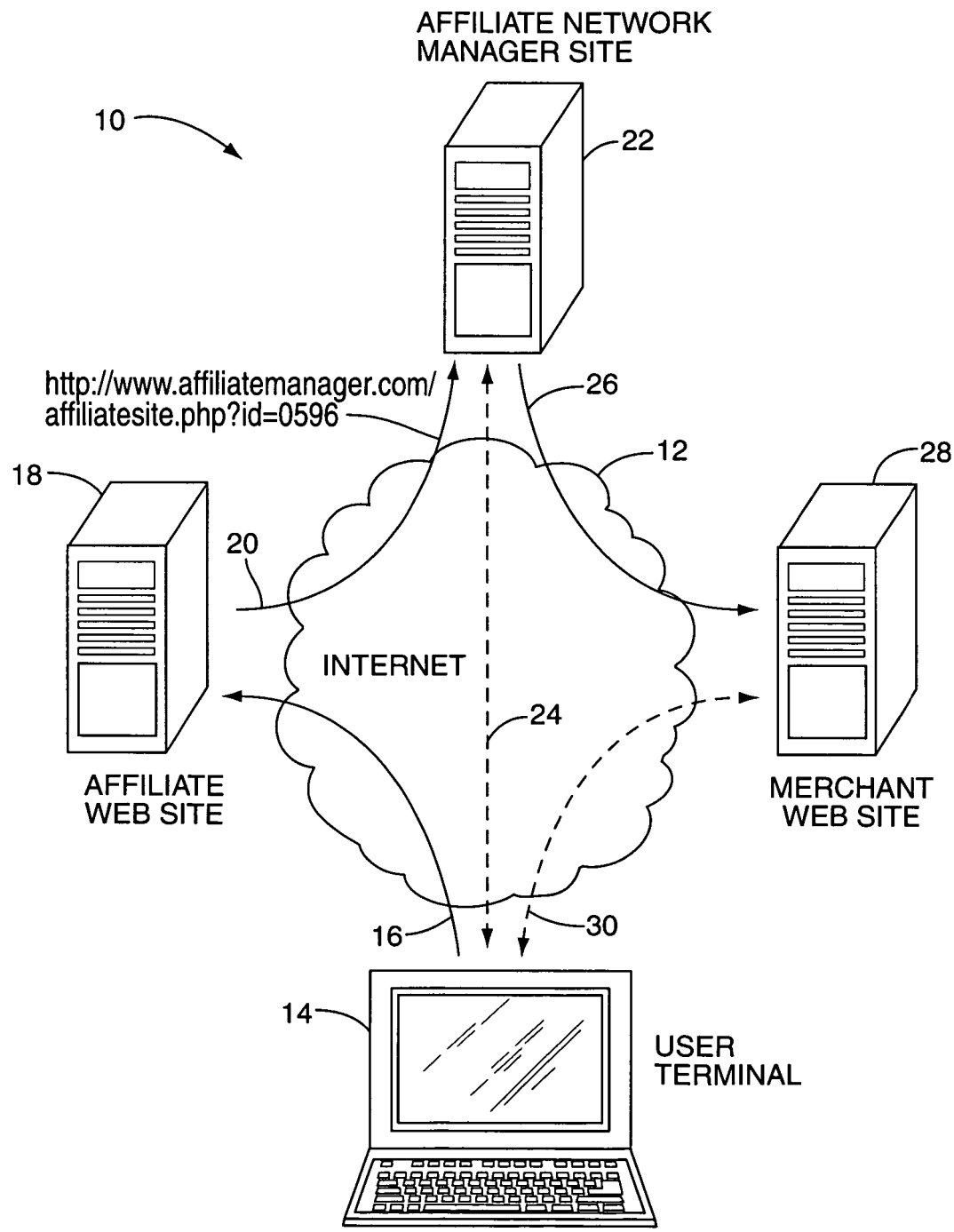
FIG. 1 is a functional block diagram of a prior art affiliate network.
Figure 2:
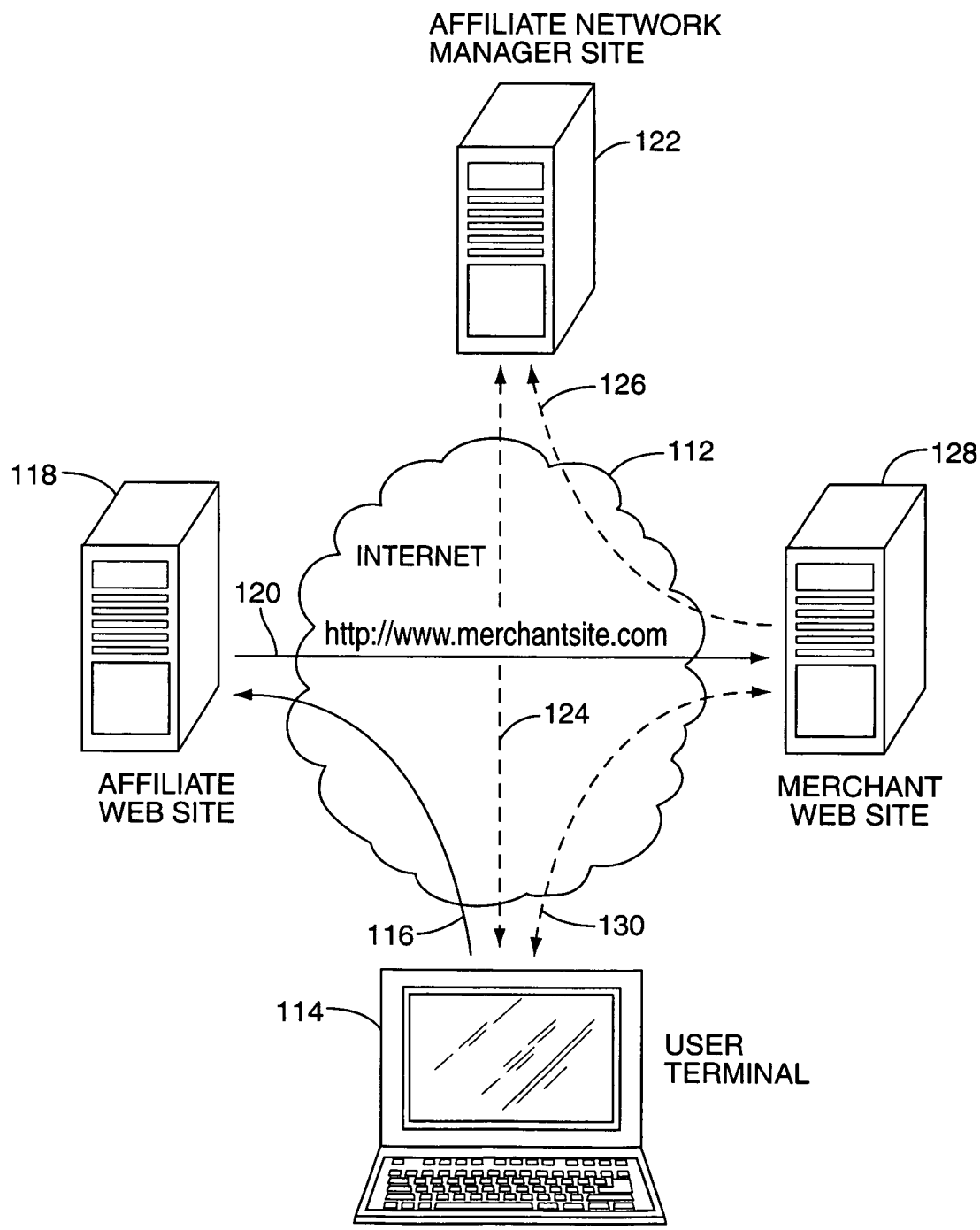
FIG. 2 is a functional block diagram of an affiliate network provides inbound affiliate link credit without coded URLs.

FIG. 2 depicts a functional block diagram of an affiliate network according to one embodiment of the present invention, indicated generally at 100. The network members are interconnected via the Internet 112. A user at a user terminal 114, which may for example comprise an Internet-connected personal computer running web browser software, surfs to an Affiliate Web Site 118, as indicated by the arrow 116. At the Affiliate Web Site 118, the user encounters an advertisement, discount offer, or the like, enticing him to visit a Merchant Web Site 128. The user clicks on a textual or graphic link of the form:

http://www.merchantsite.com

This link directs the user's browser directly to the Merchant Web Site 128. One or more software modules on the web server of the Merchant Web Site 128 detect the source of the incoming web traffic, known in the art as the referrer. The referrer—specifically, the URL that was clicked to take the user to the Merchant Web Site 128—is provided to the web server of the Merchant Web Site 128 by most browsers. Software on the web server extracts an identification of the Affiliate Web Site 118, for example, the domain name, from the referrer information, and consults a database of Affiliate Web Sites 118 authorized to receive credit for referrals. In one embodiment, a local copy of the affiliate database may reside at the Merchant Web Site 128. In another embodiment, the referrer of an incoming web request is reported by the Merchant Web Site 128 to the Affiliate Network Manager Site 122, as indicated by the dashed arrow 126, and the Affiliate Network Manager Site 122 accesses an affiliate database to determine whether the referrer is an authorized affiliate. In either case, the Affiliate Network Manager Site 122 may then read or write a cookie to the user's browser, as indicated by the dashed arrow 124. This allows the Affiliate Network Manager 122 to track the user's further activities within the affiliate network.

The Merchant Web Site 128 may write one or more cookies to the user's terminal 114, as indicated by the dashed arrow 130. This allows the Merchant Web Site 128 to track the user's activities, such as the contents of a virtual shopping cart. The Merchant Web Site 128 may report the user's page requests and/or purchases to the Affiliate Network Manager Site 122 (as indicated by 126), for crediting the Affiliate Web Site 118 in a PPL and/or PPS system.

Figure 3:
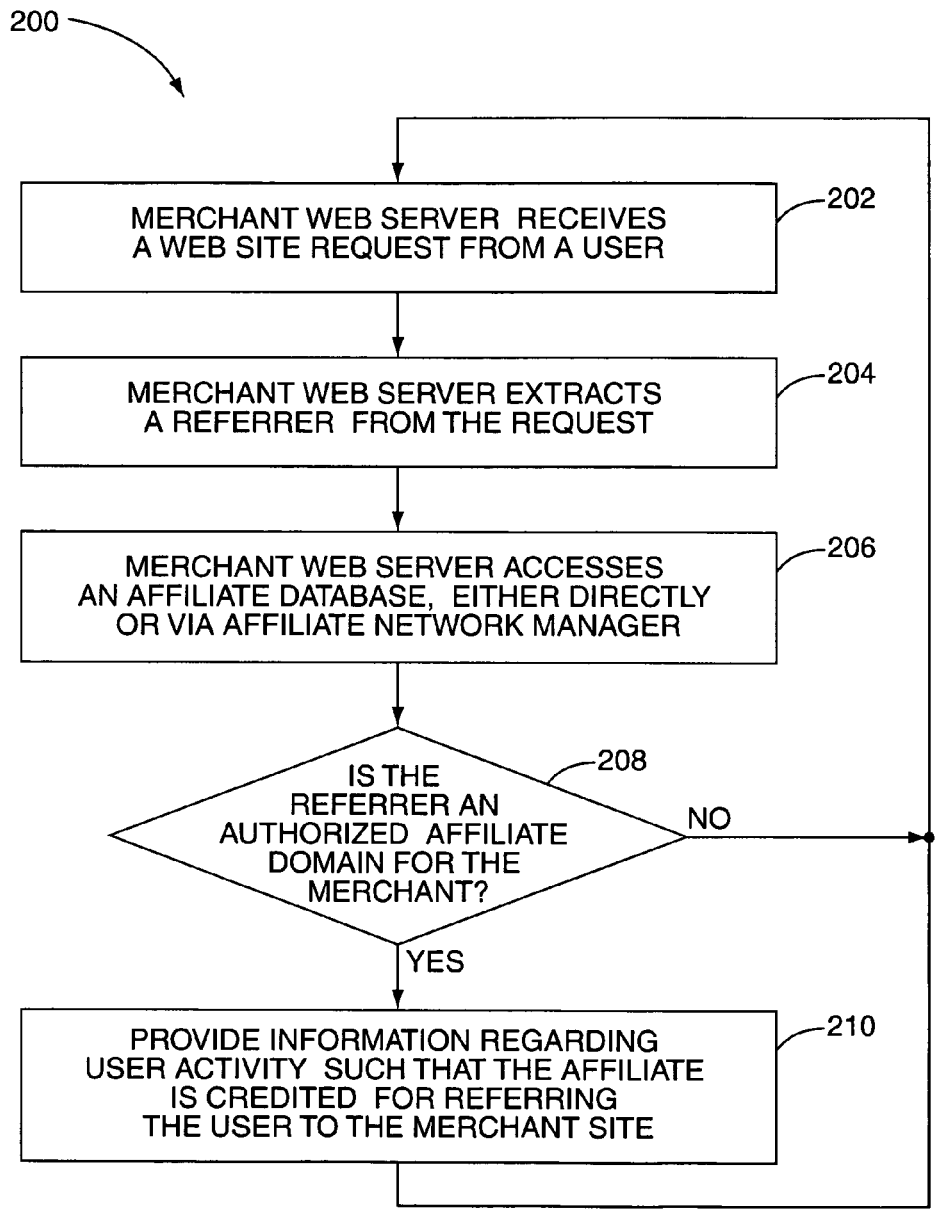
FIG. 3 is a flow diagram of a method of detecting an affiliate site by a merchant site.
Figure 4:
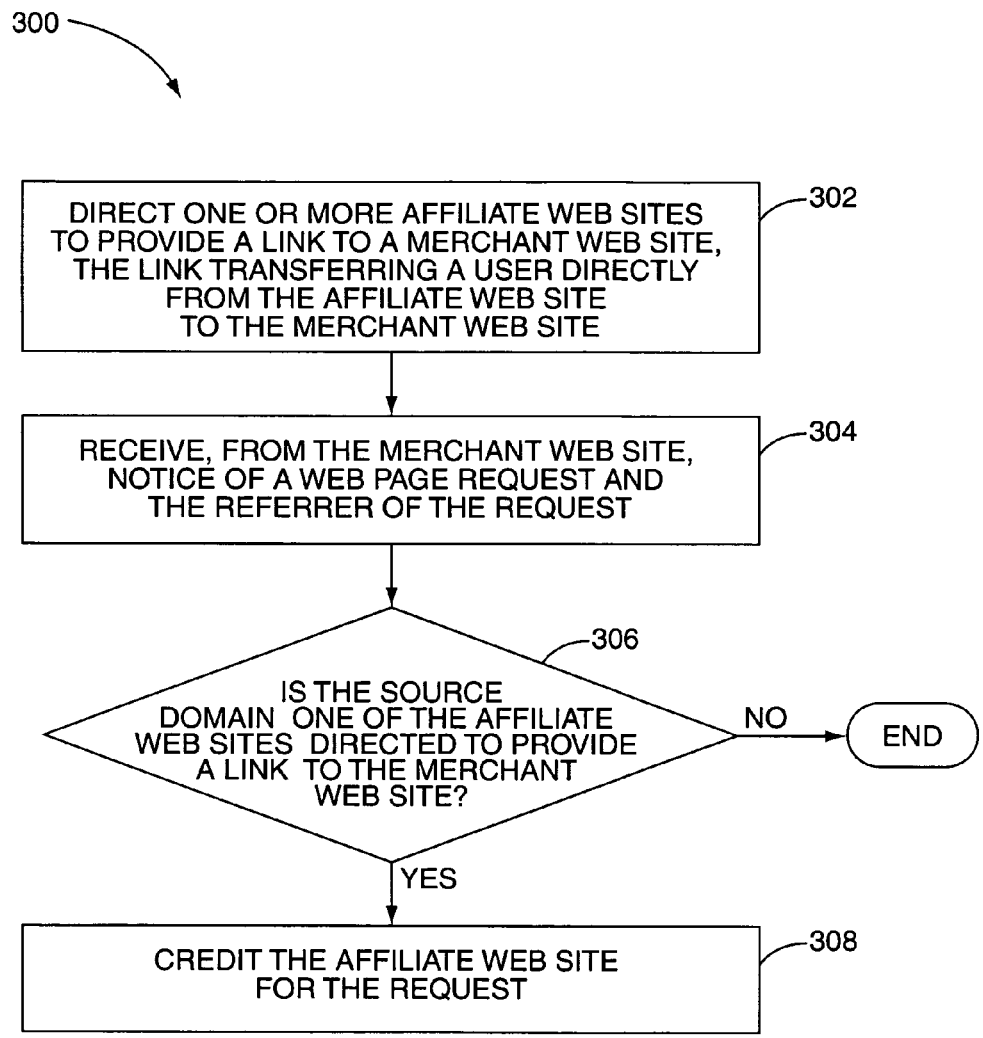
FIG. 4 is a flow diagram of a method of crediting affiliate sites by an affiliate network manager site.

FIG. 3 depicts a flow diagram of a method of detecting whether a request at a Merchant Web Site 128 was generated at an Affiliate Web Site 118, indicated generally at 200. A web server at the Merchant Web Site 128 receives a web site request from a user (block 202). The web server then extracts the referrer from the request (block 204). That is, the web server inspects the request, and ascertains the URL from which the user's browser clicked a link directing him to the Merchant Web Site 128, if available. This information is available in approximately 95% of web site requests. If the web server is able to ascertain the referrer, it accesses an affiliate database to determine if the referrer is an authorized affiliate for the merchant (block 206). This database may be maintained locally, or may reside at the Affiliate Network Manager Site 122. In the latter case, the Merchant Web Site 128 provides the Affiliate Network Manager Site 122 with the referrer, and receives from the Affiliate Network Manager Site 122 an indication whether the referrer is an authorized Affiliate Web Site 118 for the Merchant Web Site 128. If the referrer is an authorized Affiliate Web Site 128 (block 208), the Merchant Web Site 128 provides information to the Affiliate Network Manager Site 122 allowing the Affiliate Web Site 128 to be credited for the relevant user activity (block 210). This information may comprise, for example, the affiliate and the fact of the referral for PPC, further user browsing at the Merchant Web Site 128 for PPL, and/or user purchases at the Merchant Web Site 128 for PPS.

The Affiliate Network Manager Site 122 may write cookies to the user's web browser, for tracking the user through the affiliate network, in several ways. In one embodiment, a client-side call is placed on the Merchant Web Site 128 using, e.g., javascript code of the form:

```
<script language='javascript'
src='http://www.affliatemanager.com/member/JS/
   merchantsite.php?mid=2080'>
</script>
```

In this embodiment, an affiliate manager cookie is established on the user's terminal 114 by the Affiliate Network Manager Site 122, using the connection that exists between the Affiliate Network Manager Site 122 and user's browser, as established by the Merchant Web Site 128 call. The cookie value and related information is maintained in the affiliate manager database.

In another embodiment, a server-side call is placed on the Merchant Web Site 128 using an http request and server side php code of the form:

```
$request_url='http://www.affiliatemanager.com/'.$Dev-
   Path.'merchantsite.php
   .'?LCID='.$existing_cookie_value
   .'&MerchantID='.$mid
   .'&AffiliateReferer='.$ar
   .'&MerchantURL='.$mu
   .'&IP='.$mip;
```

In this embodiment, the Merchant Web Site 128 writes a cookie to the user's terminal 114. The cookie is passed to the Affiliate Network Manager Site 122 from the Merchant Web Site 128 as part of the call. The Affiliate Network Manager Site 122 stores the value of the cookie and related information in the affiliate manager database.

In either case—client-side or server-side cookie writing—the Affiliate Network Manager Site 122 may track the user and compile information regarding the user's activity at sites within the affiliate marketing network.

In addition to increasing the inbound link credit of Merchant Web Sites 128 and reducing or eliminating cookie hijacking, the direct linking from Affiliate Web Sites 128 to Merchant Web Sites 128 according to the present invention further enables non-affiliate sources of traffic to be identified and analyzed as if they were affiliates within the affiliate marketing network. That is, because the Affiliate Network Manager Site 122 does not identify Affiliate Web Sites 128 by a unique identifier previously assigned to them (and included in a query string when user traffic is diverted through the Affiliate Network Manager Site 122 on its way to a Merchant Web Site 128), but rather by the referrer field of the user's browser request at the Merchant Web Site 128, tracking and analysis of traffic to Merchant Web Site 128 is not limited to authorized affiliates. Rather, the Affiliate Network Manager Site 122 may additionally track user traffic to Merchant Web Sites 128 originating outside the affiliate marketing network as if the traffic were referred by Affiliate Web Sites 128 (although without crediting the non-affiliate sites for user activity).

For example, a Merchant Web Site 128 may receive significant traffic from a handful of search engines, and from a product review site, none of which participate in the affiliate marketing network. Unlike in prior art affiliate networks, according to the present invention, the referring web site is identified. The Affiliate Network Manager Site 122 may track the user's activities, using either client-side or server-side cookie writing, as described above. Furthermore, the quantity of traffic and cumulative user activity originating from such non-affiliate referring web sites may be tracked and analyzed. From this information, a Merchant Web Site 128 may discover significant patterns in how traffic flows to its site—patterns that would remain hidden in prior art affiliate marketing networks. The Merchant Web Site 128 may decide to purchase a premium ordering in a search engine results display, or may invite the product review site to participate in the affiliate marketing network.

Still further, the referrer identification according to the present invention significantly reduces or eliminates affiliate fraud. Unscrupulous affiliates, in order to maximize the traffic driven to a Merchant Web Site 128, may embed prior art affiliate marketing links (that is, links diverting user traffic through an Affiliate Network Manager Site 122, that identifies the Affiliate Web Site 128 by a code embedded in a query string) in a wide variety of web sites that exceed its affiliate network agreement. For example, affiliates may pepper adult sites with prior art affiliate marketing links, perhaps disguised as images or links that make no mention of the Merchant Web Site 128 to which the user is actually diverted. As another example, an unscrupulous affiliate may create a web site comprising only a list of its prior art affiliate marketing links, and pay users to repeatedly click on the links, driving unearned PPC credits to the affiliate. By identifying the referring web site by the referrer field, the present invention significantly reduces such fraud, by refusing to credit affiliates for traffic or user activity that originates from sites other than authorized Affiliate Web Sites 128.

The referring web site identification method of the present invention may increase the inbound link credit of Merchant Web Sites 128, which may improve their ranking in the search results listings of organic search engines. The present invention virtually eliminates cookie hijacking and many other forms of affiliate fraud. The present invention additionally allows non-affiliate referring web sites and user traffic from those web sites to be tracked and analyzed as if it originated from affiliate web sites, providing significant Return On Investment (ROI) information to Merchant Web Sites 128 regarding their online advertising and marketing efforts.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of detecting, by a merchant web server, an affiliate site referring web traffic to a merchant web site, comprising:
   receiving, by the merchant web server, a user request for a web page, wherein the user request was generated by a user activating, via a web browser, a link on a referring web site, the link comprising a uniform resource locator (URL) of the merchant web site, such that activating the link directs the user's web browser directly to the merchant web site and not via an affiliate manager site;
   identifying, by the merchant web server, a URL of the referring web site from the user's web browser;
   transmitting, by the merchant web server, the referring web site URL to a database associated with an affiliate manager site;
   in response to the transmitting of the referring web site URL to the database associated with the affiliate manager site, receiving, by the merchant web server, an indication that the referring web site is an authorized affiliate; and
   transmitting, by the merchant web server, to the affiliate manager site, information regarding user activity performed at the merchant web site, to credit the authorized affiliate.

2. The method of claim 1 wherein the identifying, by the merchant web server, the referring web site URL from the user's web browser comprises extracting the referring web site URL from a referer field of the user's web browser.

3. The method of claim 1 wherein the user activity performed at the merchant web site includes user purchases executed through the merchant web site.

4. The method of claim 3 further comprising:
   writing, by the merchant web server, a cookie to the user's web browser; and
   tracking user purchases executed through the merchant web site by updating and reading the cookie.

5. The method of claim 1 wherein the merchant web site URL on the referring web site does not include a query string.

6. The method of claim 1 wherein the information regarding user activity performed at the merchant web site, to credit the authorized affiliate, comprises information related to Pay Per Click (PPC) credit.

7. The method of claim 1 wherein the information regarding user activity performed at the merchant web site, to credit the authorized affiliate, comprises information related to Pay Per Lead (PPL) credit.

8. The method of claim 1 wherein the information regarding user activity performed at the merchant web site, to credit the authorized affiliate, comprises information related to Pay Per Sale (PPS) credit.

9. A merchant web server operative to detect an affiliate site referring web traffic to a merchant web site, comprising:
   a transceiver operative to communicate with network nodes on a network; and
   a controller operative to control the transceiver, and further operative to:
      receive a user request for a web page, wherein the user request was generated by a user activating, via a web browser, a link on a referring web site, the link comprising a uniform resource locator (URL) of the merchant web site, such that activating the link directs the user's web browser directly to the merchant web site and not via an affiliate manager site;
      identify a URL associated with the referring web site from the user's web browser;
      transmit the referring web site URL to a database associated with an affiliate manager site;
      in response to transmitting the referring web site URL to the database associated with the affiliate manager site, receive an indication that the referring web site is an authorized affiliate; and
      transmit, to the affiliate manager site, information regarding user activity performed at the merchant web site, to credit the authorized affiliate.

10. The merchant web server of claim 9 wherein the controller is operative to identify the referring web site URL from the user's web browser by extracting the referring web site URL from a referer field of the web browser operated by the user.

11. The merchant web server of claim 9 wherein the user activity performed at the merchant web site includes user purchases executed through the merchant web site.

12. The merchant web server of claim 11 wherein the controller is further operative to write a cookie to the web browser operated by the user; and
   track user purchases executed through the merchant web site by updating and reading the cookie.

13. The merchant web server of claim 9 wherein the merchant web site URL on the referring web site does not include a query string.

14. The merchant web server of claim 9 wherein the information regarding user activity performed at the merchant web site, to credit the authorized affiliate, comprises information related to Pay Per Click (PPC) credit.

15. The merchant web server of claim 9 wherein the information regarding user activity performed at the merchant web site, to credit the authorized affiliate, comprises information related to Pay Per Lead (PPL) credit.

16. The merchant web server of claim 9 wherein the information regarding user activity performed at the merchant web site, to credit the authorized affiliate, comprises information related to Pay Per Sale (PPS) credit.

* * * * *